United States Patent

Münkel et al.

Patent Number: 5,207,566
Date of Patent: May 4, 1993

[54] EXHAUST GAS TURBOCHARGER BEARING

[75] Inventors: Uwe Münkel, Frankenthal; Thomas Dücker, Bobenheim-Roxheim; Gerhard Oberholz, Freinsheim, all of Fed. Rep. of Germany

[73] Assignee: Aktiengesellschaft Kuehnle, Kopp & Kausch, Frankenthal, Fed. Rep. of Germany

[21] Appl. No.: 643,266

[22] Filed: Jan. 22, 1991

[30] Foreign Application Priority Data

Jan. 30, 1990 [DE] Fed. Rep. of Germany ....... 4002583
Dec. 6, 1990 [EP] European Pat. Off. ........ 90123403.9

[51] Int. Cl.⁵ ............................................. F04B 17/00
[52] U.S. Cl. ................................................. 417/407
[58] Field of Search ............... 417/405, 406, 407, 408, 417/409, 360; 384/114, 215, 218, 373, 398, 399, 901; 60/602.5

[56] References Cited

U.S. PATENT DOCUMENTS

| | | | |
|---|---|---|---|
| 3,056,634 | 10/1962 | Woollenweber, Jr. et al. | 417/407 |
| 4,077,680 | 3/1978 | Ashaver et al. | 384/218 |
| 4,370,106 | 1/1983 | Lauterbach | 417/407 |
| 4,605,316 | 8/1986 | Utecht | 384/215 |
| 4,838,711 | 6/1989 | Muenkel | 384/215 |
| 5,026,260 | 6/1991 | Gutknecht et al. | 184/6.11 |
| 5,076,766 | 12/1991 | Gutknecht et al. | 417/407 |

FOREIGN PATENT DOCUMENTS 718715 9/1965 Canada .
900602 7/1962 United Kingdom ................ 384/901

OTHER PUBLICATIONS

"Hauptkatalog", Seeger-Orbis GmbH, Feb. 1987, pp. 14–15, 58–59, 182–183 (German catalog) No Translation.

Primary Examiner—Richard A. Bertsch
Assistant Examiner—Timothy S. Thorpe
Attorney, Agent, or Firm—Foley & Lardner

[57] ABSTRACT

A turbocharger bearing is disclosed containing a sleeve (26) which is floatingly disposed in a bore (18) of a bearing case (6) for radially mounting a shaft (14). To prevent rotation of the sleeve an element is disposed in the bearing case (6), which engages both a notch in the sleeve (26) and a recess (48) in the bearing case (6). This arrangement prevents high surface pressures between the element and the sleeve (26) and between the element and the bearing case (6). The element is constructed as a retaining ring (30) having a tongue (48) and at least one boss (54, 56). The tongue (48) engages the recess (46) in the bearing case. The boss (54, 56) is pointed toward the end face (74) of the sleeve (26) where its outside surface (70, 72) contacts at least one surface of the notch (76) formed in the end face (74) of the sleeve (26).

23 Claims, 3 Drawing Sheets

EXHAUST GAS TURBOCHARGER BEARING

BACKGROUND OF THE INVENTION

This invention relates to a turbocharger bearing arranged in a bearing case for radially mounting a shaft, said bearing comprising a sleeve which is floatingly disposed in a bore in said bearing case and is secured against axial displacement, and an element disposed in the bearing case for securing the sleeve against rotation.

A turbocharger bearing is disclosed in U.S. Pat. No. 4,838,711. To hold the sleeve against rotation, a spring is provided having a first end which engages an axial groove in the sleeve. The bearing case contains a recess opening preferably radially toward the shaft, in which the other end of the spring engages. Between the first end of the spring and the groove a practically linear contact is present due to which comparatively high surface pressures can arise and, in some cases, damage to the sleeve can occur. The spring is disposed substantially in a radial plane with respect to the shaft, while the two ends are bent axially by about 90° each. Especially at the bends there is a special danger of breakage. That is, high-frequency vibration of the spring is to be expected, in which case difficulties must be expected with regard to its behavior under vibration and its life at rotational speeds above 150,000 rpm. Such high rotational speeds are required especially of so-called small turbochargers which are used in engines of up to about 1.5 liters or no more than 2 liters. The shafts of such turbochargers are extremely thin to keep friction losses low, and hence they are flexible. Additional difficulties arise in high-speed turbochargers of this kind due to an effect known as "oil whip," which can occur in speed ranges above twice the first or second critical speed. This effect causes an excitation of the shaft in the sense that the shaft ends perform a superimposed, second rotational movement about the geometric axis. The shaft portion situated between the two axially spaced bearing surfaces of the bearing sleeves is deflected in the opposite direction, and one speaks therefore of a so-called "jump-rope" effect. If the superimposed rotational movement occurs at half the shaft speed, a metal-to-metal contact can occur between the shaft and the bearing sleeve which can result in the complete loss of the bearing's capacity and the destruction of the bearing. The deformation of the shaft can lead to an unacceptable edge pressure between the ends of the sleeve and the journal boxes. Floating journal boxes can perform slight radial and rocking movements independently of one another.

A turbocharger is disclosed in Canadian Patent No. 718,715 with a bearing sleeve having teeth at one axial end. A thrust washer with teeth is connected with the bearing box, and the teeth engage the teeth of the bearing sleeve to prevent rotation. The free movement of the bearing sleeve is at least limited in other degrees of freedom. Thus the other two rotational degrees of freedom, namely about the axes perpendicular to the longitudinal axis, as well as the translational degrees of freedom in the direction of the longitudinal axis, are appreciably limited. A high surface pressure at the contact surfaces between the teeth of the bearing sleeve and of the thrust washer is unavoidable. Due to friction corrosion there is the danger of the destruction of the teeth, and this danger increases with the rotational speed. The free movement or floating arrangement of the sleeve is not realized in a satisfactory manner. The turbocharger of the prior art is designed for rotational speeds up to 80,000 rpm.

The main catalog of Seeger-Orbis GmbH, Wiesbadener Str. 243, D-6240 Koenigstein/Taunus, February 1987, lists retaining rings with tongue-like extensions. These extensions contain holes into which points of appropriately configured pliers are introduced for assembly or disassembly. Such retaining rings serve to axially retain bearing rings, gears and other machine parts on a shaft and/or within a bore. Anti-rotational locking is not easily possible with such retaining rings.

Small turbochargers which rotate at very high speeds, namely over 150,000 rpm, have quite small rotating masses with minimal shaft diameters. The unbalanced stress due to shaft deformation can amount to a hundred times the mass of the rotor. Such shaft flexure and the resulting jump-rope effect may become unacceptably large, so that not only can the above-mentioned mechanical damage occur, but a large amount of noise must be expected. With the spring mentioned in the beginning, the cited problems can be solved in part, while rocking of the sleeve in the bearing bore can result due to the merely one-sided support offered by the bent end of the spring. Due to such rocking, the oil-film cushioning between the sleeve and the bearing bore may be destroyed, or a metal-to-metal contact may even occur between the sleeve and the bearing bore. Due to the linear contact of the spring in the notch in the sleeve and with the other end in the recess in the bearing case, relatively great wear must be expected. Such wear can hardly be prevented even by the lubricant present in the bearing case, primarily due to the linear contact.

SUMMARY OF THE INVENTION

It is therefore the object of the invention to improve the above-described turbocharger such that, instead of the spring, other means can be used to secure the sleeve against rotation. The sleeve is to have a low mass, so as to achieve good performance under vibration, and quiet running is also to be assured. High surface pressures between contact surfaces with the resultant wear are to be avoided. Useful life is to be improved. The turbocharger is to be able to be equipped with an extremely thin and/or flexible shaft, while friction losses are to remain low. Even in the case of low rotating masses, especially of the turbine shaft, of the thin shaft, and of the compressor wheel of the turbocharger, stable rotor dynamics plus quiet running are to be assured.

These and other objects of the invention are achieved by providing a turbocharger bearing arranged in a bearing case for radially mounting a shaft, the bearing comprising a sleeve which is floatingly disposed in a bore in the bearing case and is secured against axial displacement, and a retaining ring disposed in a ring chamber of the bearing case for securing the sleeve against rotation, wherein the sleeve is provided with a groove and the bearing case is provided with a recess adjacent the ring chamber, and the retaining ring has a tongue which engages in the recess and also has at least one boss that projects toward an axial end face of the sleeve and has an outside surface which contacts at least one surface of the groove.

The turbocharger bearing in accordance with the invention is characterized by simple construction combined with high operational reliability, while even at high rotational speeds above 150,000 rpm bearing damage or undesirable noise are reliably prevented. The shaft may have an extremely small diameter to achieve low bearing friction losses, and stable operation is achieved without the disadvantages noted above. The retaining ring that is provided to prevent rotation is made of spring steel and can be manufactured at low cost. The retaining ring is produced from strip material with a rectangular cross-sectional area by stamping and pressing, preferably in a single operation, resulting in substantial cost and manufacturing advantages for mass production in large quantities, especially compared to the spring ring referred to in the beginning. The V-shaped bosses of the retaining ring engage corresponding V-shaped notches on the face end of the sleeve and form comparatively large contact surfaces, so that the high surface pressures mentioned above can be avoided. The bosses and notches extend substantially radially, the bottom of the notch desirably being adapted to the rounded contours in the area of transition of the outside surfaces of the bosses. The fit is made such that full-surface contact is assured, allowing for manufacturing tolerances. The surfaces of the grooves can therefore meet also at an acute angle. The V-shaped notch can be formed simply and with little difficulty in the end face of the sleeve by means of a shaped milling cutter. Furthermore, an oil film forms between the face end of the sleeve and the retaining ring to prevent wear. The V-shaped bosses extend radially beyond the surface of the retaining ring, which lies substantially in a radial plane, and engage the matingly shaped notches in the face end of the sleeve. Preferably, two diametrically disposed bosses are provided in the retaining ring in order to obtain symmetrical blocking against rotation of the sleeve. Consequently the sleeve can no longer tilt in the bearing bore, and direct contact between the surfaces of the sleeve and the bearing bore is prevented. Finally, there is no danger of disrupting the oil-film damping between the sleeve and the bearing bore.

The retaining ring can be installed using an ordinary tool of the kind generally used with retaining rings. The retaining ring has, in a known manner, two extremities with small holes into which tips of conventional pliers are inserted for installation. On the diametrically opposite side, the retaining ring has a radially outwardly pointing tongue which is U-shaped and engages in the recess of the bearing case. To facilitate installation, this tongue is advantageously bent out of the plane of the retaining ring at an angle such that, in the installed state, the tongue is pointed away from the sleeve. Thus it is possible when installing the retaining ring to simply insert the retaining ring with the tongue in position and with the ends that contain the holes tilted away from the bearing sleeve, so that the tips of the pliers inserted into the holes in the ring ends do not reach the end face of the sleeve. The recess is preferably only deep enough that the bent tongue will permit the retaining ring to be installed only in one, defined position. The base or rear surface of the recess is substantially flush with the end face of the bearing sleeve. The recess in the bearing case for receiving the U-shaped tongue is preferably disposed at a depth in the axial direction of the bearing case corresponding to the rear surface of the ring chamber, which in this first embodiment is an annular groove, adjacent the bearing sleeve. Consequently the retaining ring cannot be misinstalled in a 180° reversed position, since this is prevented by the bottom surface of the recess. After the installation tool or pliers is removed, both the free end portions of the retaining ring can be pushed toward the sleeve and snapped fully into the annular groove in the bearing case.

In a preferred embodiment of the invention the retaining ring is held axially in the bearing case by means of a second ring, in which case the retaining ring serves only to prevent the bearing sleeve from revolving. Due to this separation of function two parts are present, namely a retaining ring to prevent rotation and an additional ring for axial locking, which can be designed independently of one another as regards material and function. This results in appreciable advantages over the first retaining ring embodiment which serves both for axial and for rotational locking. In the first embodiment, problems can arise from the fact that the retaining ring made of spring steel can break, especially at the flexural points, due to its limited elasticity. Furthermore, a risk of breakage may result from the open configuration of the retaining ring. Since the retaining ring of the first embodiment is inserted into the groove in the case, a functionally required preload or stress arises which can lead to fracture as a result of high-frequency vibrations during operation. Finally, it is rather difficult to automate the installation of the retaining ring of the first embodiment. Because of the separation of functions achieved by the second embodiment, and the fact that it is divided into a retaining ring to prevent rotation and a second ring for axial locking, the aforementioned difficulties are reliably avoided. The retaining ring can now be inserted automatically, with free play, into the groove provided for it in the bearing case. Then the additional ring is inserted, likewise automatically, into the bearing case by means of a tool, especially a tapered mandrel. The second ring is axially locked in a corresponding annular groove in the bearing case and provides for the axial fixation of the retaining ring, which is now held without preloading and with sufficient free play in the axial and/or radial direction. The second ring may be designed as a regular model or heavy model retaining ring in accordance with DIN standard 472, or as an L-ring, V-ring, or snap ring in accordance with DIN 5417 or 7993, respectively. Of course, it is within the scope of the invention to provide other rings which are locked axially in a bore or groove and enable axial retention of another component—in this case the retaining ring together with the bearing sleeve. Since the retaining ring does not consist of hardened material (such as spring steel), the danger of breakage is advantageously prevented and the damping action is appreciably improved. The manufacture of the retaining ring is simplified and rejects need no longer be feared. Additional embodiments are listed in the dependent claims.

BRIEF DESCRIPTION OF THE DRAWINGS

The invention will be further explained below with reference to particular preferred embodiments illustrated in the accompanying drawings in which.

DETAILED DESCRIPTION OF PREFERRED EMBODIMENTS

Figure 1:
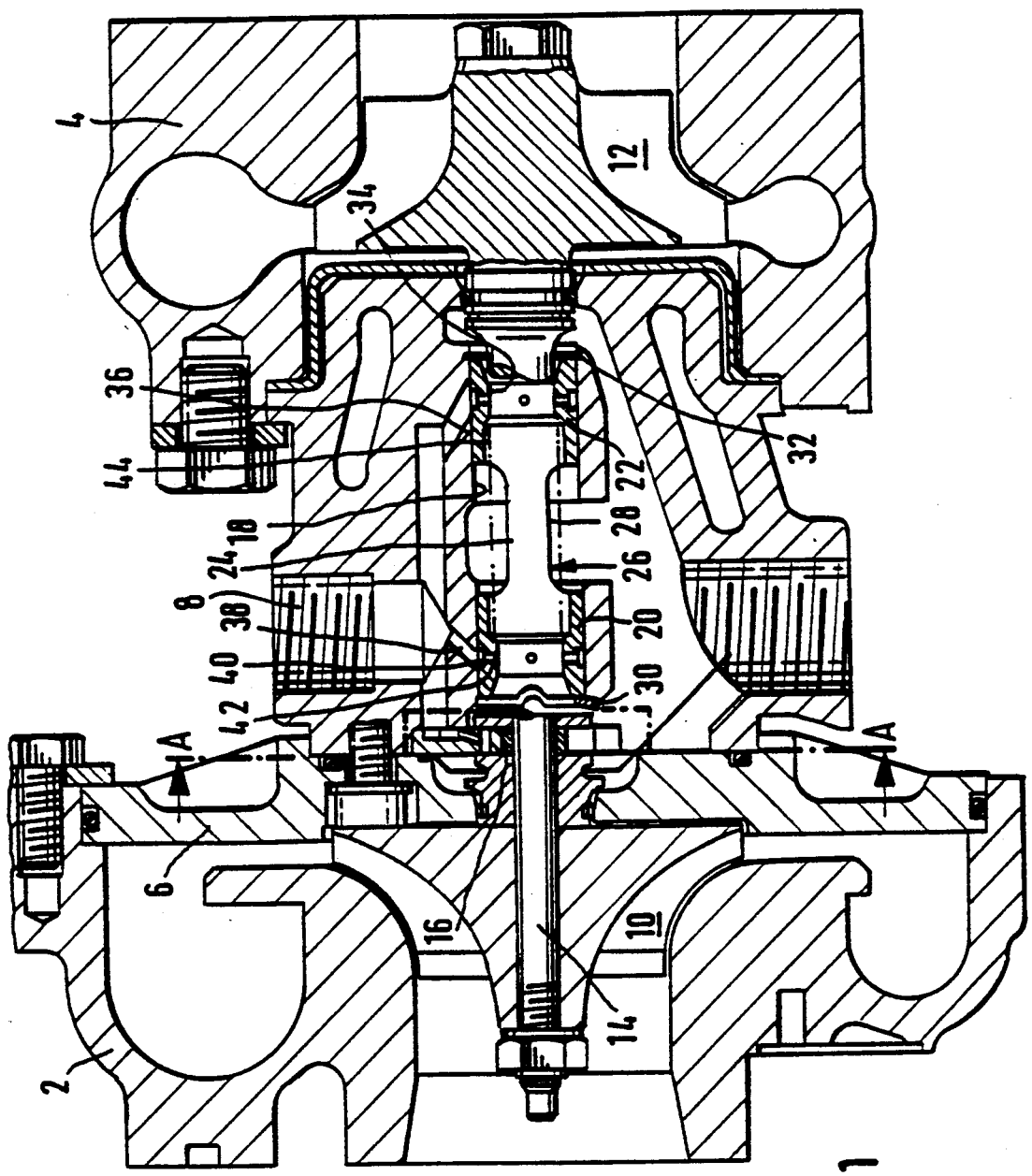
FIG. 1 is an axial longitudinal section through a turbocharger according to the invention.

In FIG. 1, on the left is shown a compressor housing 2 and on the right a turbine housing 4, which are joined together in a known manner by a bearing case 6. A compressor wheel 10 and a turbine wheel 12 are fixedly mounted on a shaft 14, for which a thrust bearing 16 is provided in bearing case 6 to hold it axially. Oil under pressure, especially from the motor, can be fed through a bore 8 to the bearing case 6 to cool and lubricate the bearings.

The shaft 14 has a relatively small diameter and is radially mounted in an internal bore 18 in the bearing case 6 on two axially spaced bearing bushes 20 and 22. These bearing bushes 20 and 22, are connected together by means of two axially arranged, narrow arms 24 to form a sleeve 26. In the drawing, only one arm 24 situated behind the plane of drawing can be seen. The second arm is correspondingly situated in front of the plane of drawing. The sleeve 26 has one opening 28 on each side between the two arms 24. The arms 24 are each disposed laterally beside the shaft, and the lubricant can drain out unhindered through the opening 28 situated underneath the shaft; any backing up of the oil in the middle part of the sleeve, and losses resulting therefrom, are prevented. The two arms 24 have approximately the same length axially as the outer bearing surfaces 36 of the two bearing bushes 20 and 22, described hereinafter.

The sleeve 26 is disposed with free play in the bearing case 6 axially between two retaining rings 30 and 32, the shaft 14 being axially mounted by the aforementioned axial bearing 16. The retaining ring 32 facing the turbine wheel 12 is constructed in a conventional manner, disposed in an annular groove in the bearing case, and serves exclusively for axial retention. On the other hand, retaining ring 30, which faces the axial bearing 16 and the compressor wheel 10, is designed to prevent rotation of the sleeve in a special manner which will be explained in detail below.

The outer bearing surfaces 36 of the bearing bushes 20 and 22 each have a greater length than the inner bearing surfaces 34. Between the internal bore 18 and the outer bearing surfaces 36, there is an oil-film gap present in each case, which has a substantially greater axial length and hence greater area, than the internal bearing surfaces 34. To each bearing surface there leads a bore 38 through which the oil fed under pressure into bore 8 is delivered to the bearing surfaces. The bearing sleeves contain circumferential grooves 40 having four radial bores 42 distributed over the circumference, through which the oil under pressure reaches the internal bearing surfaces. Toward the center of the sleeve 26 the internal bearing surfaces 34 are each adjoined by expanded portions 44 of greater diameter. These expanded portions merge with the arms 24 which are spaced a corresponding radial distance from the shaft 14. The two expanded portions 44 have an axial length of the same order of magnitude as the internal bearing surfaces 34. The internal bearing surfaces 34 are therefore substantially smaller than the outer bearing surfaces 36, thus keeping friction losses low.

Figure 2:
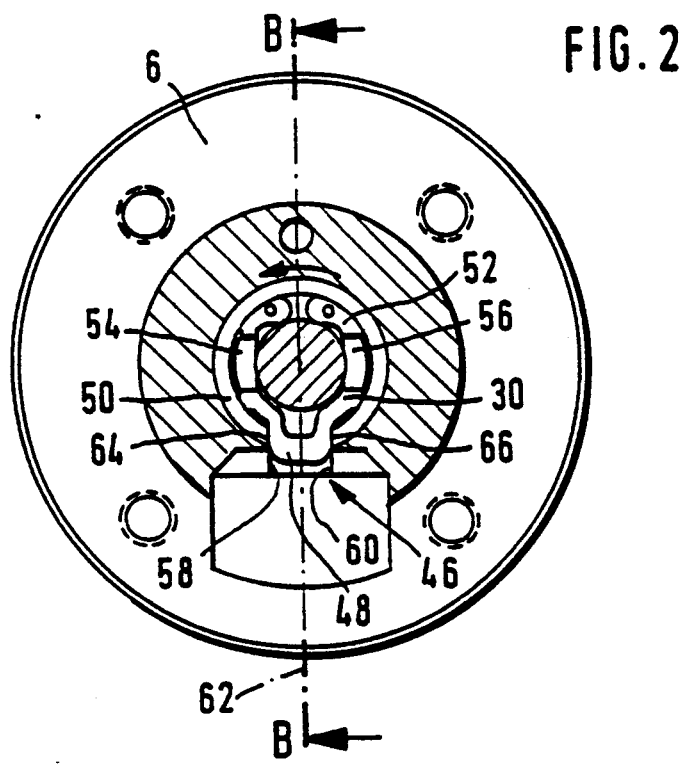
FIG. 2 is a section taken along line A—A of FIG. 1.

FIG. 2 shows a section along line A—A of FIG. 1, looking toward the bearing case 6 which is provided with a recess 46. This recess 46 is engaged by a U-shaped tongue 48 on the retaining ring 30. Retaining ring 30 is arranged with its radially outwardly disposed supporting portions 50 and end portions 52 in an annular groove in the bearing case behind the plane of drawing. Diametrically opposite the recess 48 the retaining ring 30 has the two end portions 52 which, in a known manner, contain holes for an installing tool. The retaining ring 30 contains, at an angle of substantially 90° from the tongue 48 and the two end portions 52, two radial bosses 54, 56, whose apexes point toward the bearing sleeve (in this case behind the plane of the drawing). By means of the radially outwardly bent tongue 48, the retaining ring 30 is held in the circumferential direction in the bearing case 8. The bosses 54 and 56, engage corresponding notches in the bearing case, which is thus secured against rotation with respect to the bearing case 6. The recess 46 contains two abutment surfaces 58 and 60, which extend in the axial direction and especially are situated substantially parallel to and/or symmetrical with the central plane 62 of the recess 46. The axial width of the abutment surfaces 58 and 60 assures that the lateral surfaces 64 and 66 of tongue 48, which also extend in the axial direction, will make not just linear contact, but contact over a comparatively large area, thereby preventing unacceptably high surface pressures.

Figure 3:
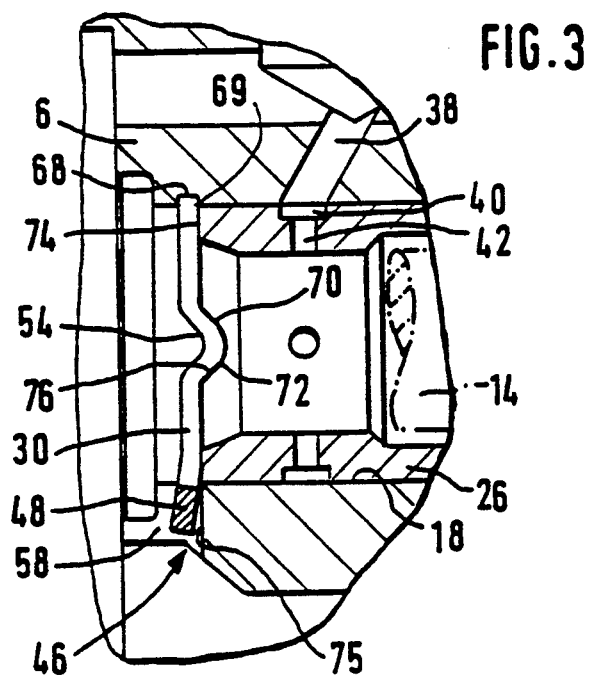
FIG. 3 is a section along line B—B of FIG. 2.

FIG. 3 is an enlarged cross-sectional view taken along section line B—B of FIG. 2, in which only part of shaft 14 is shown. The bearing case 6 with the bore 38 for the pressure lubrication, and likewise the bearing sleeve 26 with the circumferential groove 40 and the radial bores 42, can easily be seen. At the axial end face 74 of the sleeve 26 is the retaining ring 30, which is disposed with its radially outermost portions in the ring chamber 68, which is in the form of an annular groove in the bearing case 6. The clearance provided for the free-floating movement of sleeve 26 both radially with respect to the internal bore 18 and axially with respect to the retaining ring 32 is not shown for the sake of ease of illustration. Also, the abutment surface 58 of recess 46 can be seen, the lateral surface of tongue 48, which is substantially parallel to the plane of drawing, being in contact with this abutment surface 58. The back surface 75 of the recess 46 lies in substantially the same radial plane as the rear surface 69 of the annular groove or chamber 68. The bent tongue 48 thus assures that the retaining ring 30 will always be installed so that the boss 54 will engage the notch 76. This increases the reliability of assembly, since it is impossible to misinstall the retaining ring 30 in a 180° reversed position. As a result, when the retaining ring 30 is installed with a tool, the edge of the U-shaped tongue 48 will contact the surface 75, and erroneous insertion of the retaining ring 30 into annular groove 68 is impossible. The boss 54 has a substantially V-shaped cross section, and it extends substantially in the radial direction. The flat outside surfaces 70, 72, of the boss 54 also are disposed substantially in a V-shape, at an angle on the order of 90° to one another. The sleeve 26 has at its axial end face a likewise V-shaped notch 76 which is engaged by the boss 54. The notch 76 likewise extends in the substantially radial direction. On the opposite side, namely in front of the plane of drawing in FIG. 3, the retaining ring has the other boss, previously mentioned, and also the sleeve 26 has an additional notch corresponding to the above-mentioned notch 76. These two notches are formed simply in the end face in a single operation by means of a milling cutter. The contour of the flat notch surfaces matches the exterior surfaces 70 and 72 of the boss 54 including the transitional radius formed by bending or pressing, between the external surfaces disposed at an angle on the order of 90° to one another. The external surfaces 70 and 72 of the boss 54 lie flat against the facing surfaces of the notch 76, reliably avoiding linear contact with its attendant high surface pressures. The bearing sleeve 26 is positioned with axial play between the retaining ring 30, shown here, and the other retaining ring which was described above. Some of the lubricant supplied through the bore 38 partially also enters the circumferential space between the bearing case 6 and the sleeve 26 and passes from there to the end face 74 and to the retaining ring 30 and thus also to the area of the notch 76, thereby reliably preventing wear. By means of the notches 76 and the end faces 72, 74, the sleeve 26 is secured against rotation, but otherwise the free movement of the sleeve in the other degrees of freedom remains assured. Furthermore, the symmetrical arrangement of the two bosses and notches diametrically opposite one another particularly prevents the sleeve 26 from rocking in the internal bore of the bearing case 6, so that the oil-film damping between the sleeve and the bearing bore or internal bore is not impaired.

Figure 4:
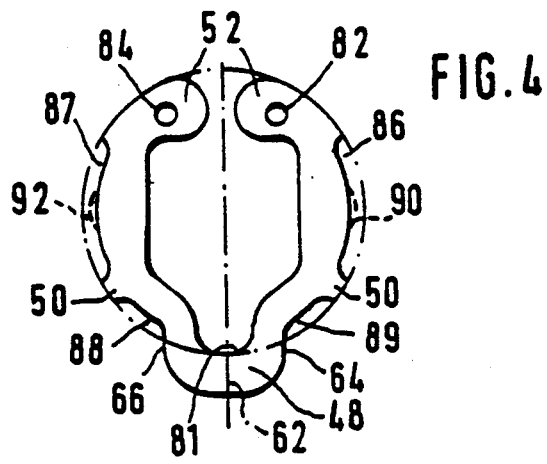
FIGS. 4 and 5 are views of the retaining ring viewed in the axial and radial directions, respectively.
Figure 5:
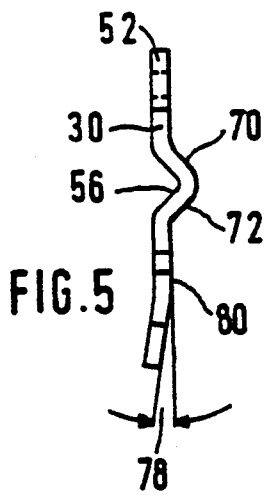

FIGS. 4 and 5 show the retaining ring 30 in axial and radial views, respectively. The retaining ring is formed spring steel and is made in a single operation by stamping. The bosses 54 and 56 point axially toward the bearing sleeve, while the U-shaped tongue 48 is bent at a small angle in the other direction. The inside 81 of tongue 48 is spaced away from the center on a radius that is at least equal to or greater than the radius of the outer surfaces of the support portions 50 as indicated by the broken line, thereby assuring sufficient flexibility in the circumferential direction. The U-shape of the tongue 48 results in additional spring action. It is to be noted, however, that the inside 81 of the tongue can also, if desired, lie on a smaller radius. It is important that the region 80 at which the radially outward bend in tongue 48 begins, be at a point at which the annular groove in the bearing case merges with the opening. The retaining ring 30 has holes 82, 84, in its end portions 52, which are separated from one another by a gap, for an installing tool, in particular a conventional pliers for installing retaining rings.

The retaining ring 30 has cutouts 86 and 87 in the area of the bosses 54 and 56 to permit easy insertion into the annular groove in the bearing case. These cutouts 86 and 87 furthermore forestall interference at points 94 and 92 by any material which is upset radially outward when the bosses are formed by bending and which might interfere with proper insertion into the annular groove. The support portions 50 as well as the radially outer portions of the end portions 52 of the retaining ring 30 engage the annular groove of the bearing case. To achieve perfect seating also in the area of the bent tongue 48, cutouts 88 and 89 are also provided adjacent this tongue.

The installation of the retaining ring will now be explained with reference to FIG. 1. First the conventional retaining ring 32, particularly one manufactured according to the aforementioned German Industrial Standard, and the sleeve 26 are inserted into the internal bore 18 of the bearing case. The retaining ring 30, carrying the bosses formed in accordance with the invention, is then picked up with a conventional retaining ring pliers so that the tips of the pliers engage the holes 82 and 84 in the end portions 52 which can thus be squeezed together. The retaining ring 30 is then introduced into the internal bore 18 with these pliers such that the U-shaped tongue 48 initially engages and can be inserted into the recess in the bearing case 6. It is to be noted that the tips of the pliers are longer than the material thickness of the retaining ring 30 and thus extend beyond its outer surface. The tongue is situated substantially in a radial plane, while the retaining ring 30 is angled away from the end face 74 of the bearing sleeve 26, and the end portions 52 containing the holes 82 and 84 are farthest away from the end face of the bearing sleeve. In the area of the tongue the retaining ring 32 has already snapped into the annular groove of the bearing case, so that now the pliers with the tips can be removed from the holes 82 and 84. Then the retaining ring 30 is shifted by a light axial pressure toward the bearing sleeve until its end portions 52 snap fully into the annular groove. In the fully installed state, the tongue 48 is bent away from the end face of the sleeve 26 at the angle 78. Were it not for the bend in the tongue 48, the plier tips extending through the holes 82 and 84 would bump against the end face 74 before the retaining ring 30 snapped into the annular groove 68.

Figure 6:
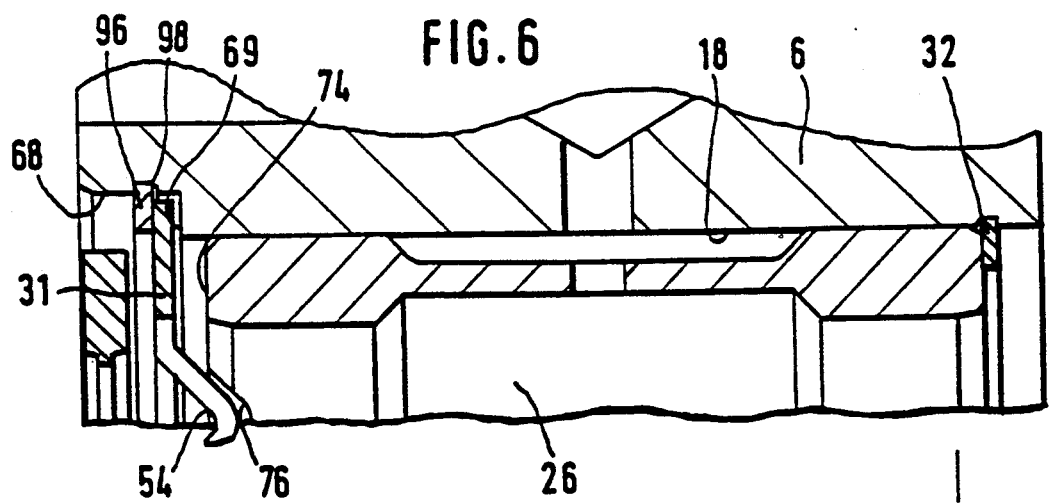
FIG. 6 is a fragmentary axial longitudinal section through a second exhaust turbocharger bearing embodiment.

FIG. 6 shows another embodiment of the invention in an axial longitudinal section. The components corresponding to those of the turbocharger of FIG. 1 are not shown, nor will they be described in further detail hereinafter. Opposite the end face 74, a retaining ring 31 is disposed in the ring chamber 68 with the boss 54 engaging the notch 76 in the sleeve 26. The ring chamber 68 has a greater diameter than the internal bore 18 and is completely open in the direction of the turbine, so that the retaining ring 31 can be inserted axially with free play and without being deformed. In this embodiment an additional ring 96, which is inserted in an annular groove 98 of the ring chamber 68, serves for axial retention. The additional ring 96 can be in the form of a retaining ring in accordance with DIN 472, a V-ring, a K-ring, a snap ring or the like. This additional ring 96 can be constructed generally as an axial retaining means for bores in a great variety of configurations. Installation can be performed simply using automated machinery, whereby the retaining ring 31 is initially placed loosely in the ring chamber 68, and then the additional ring 96 is inserted into the annular groove 98 to secure it axially.

The retaining ring 31 is formed of a non-hardened steel and thus has better damping action than spring steel, and this has a positive influence on its interaction with the bearing bush 20 of the sleeve 26. The absolute freedom of movement of the sleeve 26 axially of the bearing case 6 is greater in this special embodiment than in the embodiment in FIG. 1 due to the resilient character of the retaining ring 31. The retaining ring 31 sits loosely in the ring chamber 68 between the rear surface 69 and the additional ring 96, freedom of movement being achieved both axially and radially on account of the free play. The limitation of the movement of the floating bearing sleeve is thus reduced to a minimum and the rotor dynamics are further improved.

Figure 7:
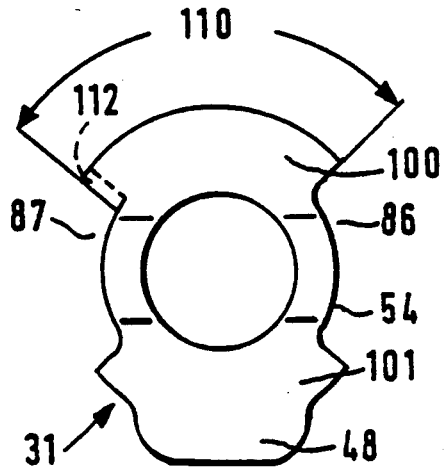
FIGS. 7 and 8 depict the retaining ring of FIG. 6 viewed in the axial and radial directions, respectively.
Figure 8:
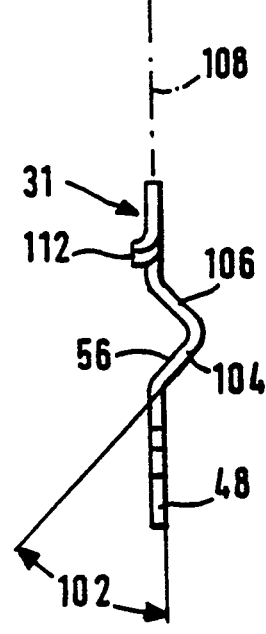

FIGS. 7 and 8 are axial and radial views, respectively, of the retaining ring 31. In this special embodiment the retaining ring 31 is in the form of a disk with an uninterrupted circumference. As it can be seen from comparison with FIG. 4, the tongue 48 is solid, since the retaining ring 31 does not have to be compressed for installation but can simply be placed in the ring chamber 68 without being deformed. The tongue 48 in this case is not bent out of the plane of the retaining ring. The retaining ring 31 again has lateral cutouts 86 and 87 in the area of the bosses 54 and 56, in order to facilitate engagement in the associated notches in the bearing bush. The radially outer parts 100 and 101 each extend over an angle 102 which is substantially 90°. Thus a secure axial abutment against the rear surface of the ring chamber on the one hand and against the additional ring 96 on the other is assured. The cutouts 86 and 87 likewise extend over an angle of the order of 90° each.

As can be seen in FIG. 8, the walls 104 and 106 of the boss 56 are inclined at an angle 102 on the order of 45° from a radial plane 108. The same applies correspondingly to boss 54. At the outer upper area 100 an installation cam 112 is provided which faces the aforementioned additional ring and engages in its opening. It is emphasized that the additional ring 96 to be inserted in the aforementioned annular groove has two free ends between which there is an opening. The installation cam 112 is needed in case the bearing surface of the additional ring is not constant over the circumference of the annular groove; this is especially the case when the additional ring is configured as a V-ring. If such a ring provided with a cam is inserted in any way, it can come to rest with its cam in the recess in the bearing case that is provided for the tongue; the tension needed for the ring is then no longer present. To prevent this, the additional ring is inserted such that the installation cam 112 of the retaining ring 31 engages in the opening which is present between the free ends of the additional ring. Thus any turning of the additional ring is prevented. The installation cam 112 is disposed in the outer area 100 which lies opposite the tongue 48. The installation cam 112 can also be disposed at a different point in the upper, outer area 100.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A turbocharger bearing arranged in a bearing case for radially mounting a shaft, said bearing comprising a sleeve which is floatingly disposed in a bore in said bearing case and is secured against axial displacement, and a retaining ring disposed in a ring chamber of the bearing case for securing said sleeve against rotation, wherein said sleeve is provided with a groove and said bearing case is provided with a recess adjacent said ring chamber, and said retaining ring has a tongue which engages in said recess and also has at least one boss that projects toward an axial end face of said sleeve and has an outside surface which contacts at least one surface of said groove.

2. A turbocharger bearing according to claim 1, wherein said boss and said groove each have a substantially V-shaped contour.

3. A turbocharger bearing according to claim 1, wherein said boss and said groove both extend radially with respect to said sleeve.

4. A turbocharger bearing according to claim 1, wherein said retaining ring has two oppositely situated bosses, and two oppositely situated, mating grooves are correspondingly arranged in said end face of said sleeve.

5. A turbocharger bearing according to claim 1 wherein said boss and said mating groove are arranged substantially orthogonal to said bore.

6. A turbocharger bearing according to claim 1, wherein a radial bore for introducing lubricating oil is provided in said bearing case, and said tongue is arranged in substantially the same axial plane as said radial bore.

7. A turbocharger bearing according to claim 1, wherein a lateral surface of said tongue contacts a lateral abutment surface of said recess.

8. A turbocharger bearing according to claim 7, wherein said lateral surface and said abutment surface are planar surfaces and extend in the axial direction of said sleeve.

9. A turbocharger bearing according to claim 1, wherein said tongue is bent through a predetermined angle away from the other portions of said retaining ring in a direction axially opposite the direction in which said boss projects.

10. A turbocharger bearing according to claim 1, wherein said recess and said ring chamber each have rear surfaces which lie in substantially the same radial plane.

11. A turbocharger bearing according to claim 1, wherein radially outwardly lying portions of said retaining ring are cut away in the vicinity of said boss.

12. A turbocharger bearing according to claim 1, wherein radially outwardly lying portions of said retaining ring are cut away at the sides of said tongue.

13. A turbocharger bearing according to claim 1, wherein said annular chamber is an annular groove formed in said bearing case for receiving said retaining ring, and said retaining ring is symmetrically configured with said tongue extending in one direction and two spaced-apart end portions extending in a direction opposite said tongue, and wherein a hole is formed in each of said end portions for receiving a tool for compressing said retaining ring.

14. A turbocharger bearing according to claim 13, wherein said tongue is substantially U-shaped in order to facilitate compression of said retaining ring.

15. A turbocharger bearing according to claim 13, wherein said retaining ring is provided on the sides of said end portions with support portions having outer surfaces which engage in said annular groove, and said tongue has a radially inner surface which lies on substantially the same radius as said outer surfaces of said supporting portions.

16. A turbocharger bearing according to claim 1, further comprising a second ring for securing said retaining ring against axial displacement in said ring chamber, and wherein said retaining ring is arranged axially between said second ring and a rear surface of said ring chamber.

17. A turbocharger bearing according to claim 16, wherein said retaining ring is arranged with axial play between said second ring and said rear surface of said ring chamber.

18. A turbocharger bearing according to claim 16, wherein said retaining ring is arranged with radial clearance between it and the circumference of said ring chamber.

19. A turbocharger bearing according to claim 16, wherein said retaining ring comprises diametrically oppositely disposed outer portions which define an outside diameter which is greater than the inside diameter of said second ring.

20. A turbocharger bearing according to claim 1, wherein said retaining ring comprises two diametrically oppositely disposed outer portions which each extend across a radial angle of about 90°.

21. A turbocharger bearing according to claim 1, wherein said ring chamber has a uniform diameter and is open at one axial end of said bearing case, and said retaining ring has a continuous circumference and can be inserted axially into said ring chamber without being deformed.

22. A turbocharger bearing according to claim 21, wherein said retaining ring has a diameter which is smaller than the diameter of said ring chamber, and said retaining ring can be inserted axially into said ring chamber with free play.

23. A turbocharger bearing according to claim 16, wherein said second ring has opposite free ends which define an opening between them, and said retaining ring carries an installation cam which engages in said opening.

* * * * *